United States Patent [19]

Thomann et al.

[11] Patent Number: 5,281,653
[45] Date of Patent: Jan. 25, 1994

[54] FULLERENE-POLYMER COMPOSITIONS

[75] Inventors: Hans Thomann, Bedminster, N.J.; Patrick Brant, Seabrook, Tex.; John P. Dismukes, Annandale; David J. Lohse, Bridgewater, both of N.J.; Jyi-Faa Hwang, Bethlehem, Pa.; Edward N. Kresge, Watchung, N.J.

[73] Assignee: Exxon Research and Engineering Company, Florham Park, N.J.

[21] Appl. No.: 797,525

[22] Filed: Nov. 25, 1991

[51] Int. Cl.$^5$ .............................................. C08K 5/01
[52] U.S. Cl. .................... 524/490; 524/495; 524/496
[58] Field of Search .................. 524/490, 495, 496

[56] References Cited

U.S. PATENT DOCUMENTS 5,114,477  5/1992  Mort et al. ............................. 106/20
5,178,980  1/1993  Mort et al. ............................. 430/71

OTHER PUBLICATIONS

EP Search Report dated Mar. 8, 1993 for Application No. 92310772.6.

Amato, "Doing Chemistry in the Round", Science, vol. 254, No. 5028, Oct. 4, 1991, pp. 30-31.
Edelson, Edward; "Buckyball-The Magic Molecule", Popular Science, pp. 52-57, 87, Aug. 1991.

Primary Examiner—Paul R. Michl
Assistant Examiner—Edward Cain
Attorney, Agent, or Firm—Linda M. Scuorzo

[57] ABSTRACT

The present invention relates to novel compositions of matter comprising fullerenes and polymers, wherein the fullerenes are combined with the polymer in an amount sufficient to result in a change or modification in the viscoelastic properties of the resulting composition from that of the unmodified polymer typically within the range of from about 0.01 wt. % to about 85 wt. %. Also included in the present invention is the process for making the novel fullerene-polymer compositions and the products produced by the process disclosed therein. The novel compositions show changes in the viscoelastic properties in comparison to the unmodified polymer, and hence, have utility in any application in which the unmodified polymer may be used, but wherein the application would benefit from the resulting change in the viscoelastic properties.

13 Claims, No Drawings

FULLERENE-POLYMER COMPOSITIONS

BACKGROUND OF THE INVENTION

1. Field of the Invention

This invention relates to fullerene-polymer compositions produced by combining a sufficient amount by weight of fullerenes to result in a change or modification of the viscoelastic properties compared to the unmodified polymer. Typically, such amount from about 0.01 to about 85 percent by weight of fullerenes in comparison to the weight of the polymer. This invention also relates to the process of making the compositions and the method of using the compositions, and includes the products produced by the process disclosed herein.

2. Discussion of Related Art

Fullerenes are hollow molecules composed only of carbon atoms which constitute a new allotropic form of carbon. Typically, fullerenes each have carbon atoms arranged as 12 pentagons, but differing numbers of hexagons. The pentagons are required in order to allow the curvature and eventual closure of the closed surface upon itself. The most abundant species of fullerene identified to date is the $C_{60}$ molecule or Buckminsterfullerene. $C_{60}$ consists of 12 pentagons and 20 hexagons and is classified as an icosahedron, the highest symmetry structure possible. The second most abundant species classified to date is $C_{70}$ and contains 12 pentagons and 25 hexagons. Characteristic of fullerenes is their general formula $C_{2n}$ where n is greater than 15. Fullerenes containing from 32 to many hundreds carbon atoms have been produced from carbon soots and detected by mass spectrometry. For further information concerning the structure of fullerenes, see, e.g., H. W. Kroto, et al., 91 CHEMICAL REVIEWS, 1213–1235 (1991). As used in this application, the terms "fullerene" and "fullerenes" means the 60 atom carbon molecule and all other hollow molecules composed only of carbon atoms. The term "higher fullerene" means fullerenes having the general formula $C_{2n}$ where n is greater than 30.

Other allotropic forms of carbon have been used in combination with polymers to improve the properties of the polymers; e.g., carbon fibers, carbon black. For further information concerning the use of other forms of carbon to enhance or modify the properties of polymers, see, e.g., G. Kraus, *Reinforcement of Elastomers*, Interscience Publishers, N.Y., 1965. These carbon structures typically contain minor amounts of other atoms such as hydrogen, oxygen and/or nitrogen and have the carbons arranged in quasi-graphitic layered planes. Carbon black, which is used extensively to modify the mechanical properties of polymers, particularly elastomeric polymers with glass transition temperatures of less than about 0° C., is prepared by incomplete combustion or thermal cracking of hydrocarbons. The resulting chemical structure and size of carbon black particles is, therefore, unlike that of fullerenes.

It has been disclosed that fullerenes could be polymerized into a polymer backbone along with unspecified comonomers to produce a polymer chain containing a fullerene unit. See Amato, Science 254, pp. 30–31 (1991). However, the disclosure does not teach the fullerene-polymer compositions of the present invention.

SUMMARY OF THE INVENTION

This invention relates to novel polymer compositions produced by combining a polymer and a sufficient amount by weight of fullerenes to result in a change or modification in the viscoelastic properties of the fullerene-polymer compositions compared to the unmodified polymer. Typically, such amount will be from about 0.01 wt. % to about 85 wt. % in comparison to the weight of the polymer, more typically from about 0.05 wt. % to about 25 wt. %. The actual amount of fullerenes in the novel composition depends on the particular viscoelastic properties desired in that composition and the identity of the starting polymer. This invention also relates to the process of making the fullerene-polymer compositions and the process of using same, and includes the composition produced by the process disclosed herein.

The process of the present invention is used to produce the fullerene-polymer compositions of the present invention. The fullerene-polymer compositions of the present invention shows a change in its viscoelastic properties in comparison to the polymer alone and, therefore, may be used in essentially any application requiring the polymer itself, but wherein the application would benefit from the changes in the viscoelastic properties of the fullerene-polymer compositions. For example, where fullerene-polymer compositions are produced that show an increase in Tg, those fullerene-polymer compositions would have utility in applications wherein the pure polymers would benefit from an improvement in its stiffening properties. In such cases, the fullerenes themselves may also be used as an additive to stiffen the polymer network.

DETAILED DESCRIPTION OF THE INVENTION

The polymers used in the practice of the present invention may be readily obtained from various chemical suppliers. Accordingly, their methods of preparation are well known to those skilled in the art.

The polymers that may be used in the practice of the present invention fall into several categories. The polymers may be amorphous, semicrystalline, or crystalline, provided that the crystallinity of the polymer is properly taken into account when choosing a solvent or cosolvent capable of combining the polymer and fullerenes. Amorphous polymers include rubbery polymers such as elastomers (e.g., polyisoprene and atactic polypropylene) and glassy thermoplastics (e.g., polystyrene and polycarbonate). Semicrystalline polymers include thermoplastics such as polyethylene, polyamides and isotactic polypropylene. The polymers may also be categorized as thermoplastics, such as the examples above, or thermoset polymers, including epoxies, polyesters, vinylesters, phenolics, polyimides, bis-maleimides, linear polymers and rigid rod polymers, such as polybenzimidazole.

The distinctions between amorphous and semicrystalline and those between thermoplastic and thermoset are not necessarily mutually exclusive, but represent different ways of categorizing and distinguishing polymeric materials. Thus, the same polymer may be either amorphous or semicrystalline, depending on the temperature of use and its melting point, and also may be a thermoset or a thermoplastic, depending on the extent of any crosslinking. Elastomers selected for this invention preferably are substantially amorphous; i.e., have crystallinity of equal to or less than about 25 wt. % and Tgs of less than about 0° C. Such polymers may be crosslinked into a network by chemical means or by physical means.

A representative but not exhaustive list of polymers that may be used in this invention includes homopolymers such as polyolefins including polyethylene, polypropylene, polybutene, and polymers of higher alpha-olefins; styrenic polymers including polystyrene, polymers made from styrene monomers with pendant alkyl groups such as poly(alpha-methyl styrene) and poly(para-methyl styrene), and halogenated versions of the above styrenic polymers; polydienes including polybutadiene, polyisoprene, and other polymers made from alkylated diene monomers; polyamides; polyimides; polycarbonates; polyisobutylene; arcylics such as poly(methyl methacrylate), poly(butyl methacrylate), poly(acrylic acid); silicones such as poly(dimethyl siloxane) and the like; polysulfones; vinyl polymers such as poly(vinyl chloride), poly(vinyl flouride), poly(vinyl alcohol), poly(vinyl phenol), poly(vinylidine chloride), poly(vinylidine flouride), poly(tetrafluoro ethylene), poly(acrylonitrile), and the like; polyesters including poly(ethylene terephthalate), poly(butylene terephthalate), and the like; polyethers including poly(ethylene oxide), poly(propylene oxide), poly(oxymethylene), and the like; poly(phenylene oxide); poly(phenylene sulfide); poly(arylates); poly(benzimidazoles) and the like; and other polymers made from polymerizable monomers; statistical copolymers of the monomers or repeat units described above including for example copolymers of ethylene with other monomers such as alpha-olefins including propylene, butene-1, hexene, octene, and the like; dienes; vinyl acetate; vinyl alcohol; vinyl chloride; vinylidene chloride; copolymers of isobutylene with other monomers including isoprene, butadiene, para methylstyrene, styrene, and the like; copolymers of styrene with other monomers including butadiene, isoprene, maleic anhydride, acrylonitrile, oxazoline, and the like; copolymers of butadiene with other monomers including acrylonitrile; copolymers of propylene with other monomers including ethylene, butene, hexane, dienes, and the like; block copolymers made from units of any of the above homopolymers or copolymers including styrene-diene block polymers such as sytrene-isoprene-styrene triblock copolymer, sytrene-butadiene-styrene triblock copolymers, styrene-ethylene/propylene-styrene triblock copolymers (all ratios of ethylene to propylene), and the like; graft copolymers made from units of any of the above homopolymers or copolymers including poly(ethylene-graft-propylene), poly(styrene-graft-butadiene) and the like; and derivatized versions of any of the above homopolymers or copolymers including for example those made by sulfonation, amination, and carboxylation and the like, such as sulfonated polystyrene, sulfonated ethylene-propylene-dienemonomer, and the like. The term "polymer" as used herein also includes combinations or mixtures of more than one polymer wherein such combination or mixture exists in single or multiphase blends. Generally the identity and composition (i.e. the ratio or amount of each type of copolymer unit desired) of the copolymer can be varied depending on the characteristics desired in the end product. It is within the skill of one ordinarily skilled in the art to make such selections. It is recommended, however, that the actual molecular weight be greater than about 500 Mn (number average molecular weight).

Macroscopic quantities of fullerenes can be produced by high temperature vaporization of solid graphite rods by resistive or arc heating in the presence of a few to several hundred torr of rare gas. The soot produced by the vaporization contains varying levels of fullerenes, dependent on the vaporization conditions. The fullerenes are extracted from the soot by placing the soot in a solvent in which the fullerenes are soluble. The solution can be filtered to remove solid particulates and then the solvent evaporated to yield fullerene powders (see, e.g., Kroto et al. Id.). Alternatively, the fullerenes can be purchased commercially. The fullerenes used in practice of the present invention consist of all fullerenes present in the particular sample of nonextracted carbon soot. While sample content depends on the method of preparation to some extent, generally, such soots contain mixtures of $C_{60}$ and higher fullerenes. Thus, the fullerenes used in the practice of this invention are selected from the group consisting of fullerenes having the general formula $C_{2n}$, where n is greater than 15, and mixtures thereof. However, other fullerene mixtures, for example $C_{60}$ and $C_{70}$ mixtures, as well as samples of individual types of fullerenes (e.g., $C_{60}$ alone), may also be used. Individual fullerenes-containing samples can be obtained by chromatographic separation. Id.

One embodiment of the present invention concerns novel fullerene-polymer compositions comprising a polymer and a sufficient amount by weight of fullerenes to result in a modification of the viscoelastic properties, in particular wherein modification of the viscoelastic properties is shown by a change in the glass transition temperature ("Tg"), of the fullerene-polymer compositions compared to those of the pure polymer. The amount of fullerene is typically from about 0.01 percent by weight to about 85 percent by weight in comparison to the weight of the polymer. More typically, the range is from about 0.05 wt. % to about 25 wt. %, most typically from about 0.1 wt. % to about 20 wt. %.

The Tg of a polymer is a measure of the temperature below which a polymer exists as a glassy matrix and at or above which it undergoes a transformation to a rubbery state. Tg of a polymer may be measured by dynamic mechanical means, which is taken as the maximum of the ratio of the dynamic viscous modulus to the dynamic elastic modulus ("tan delta" or "tangent delta"). Tg may also be measured by differential scanning calorimetry as the change in heat capacity of the polymer. A change in Tg is, thus, one measure or indication of the change in the viscoelastic properties of that polymer. A general description of viscoelastic properties is given in N. G. McCrum, C. P. Buckley, and C. B. Bucknall, Principles of Polymer Engineering, Ch. 4, p. 101, Oxford University Press, 1988. Polymeric compositions exhibit both elastic and viscous response upon the introduction of mechanical stress which depends on the temperature of the material and the rate of deformation. It has been discovered that the fullerene-polymer compositions exhibit an alteration of either the magnitude of the viscoelastic properties or the temperature at which these properties change. Typical viscoelastic properties are steady shear viscosity, dynamic elastic (also referred to as "storage") modulus, dynamic loss (also referred to as "viscous") modulus. Changes in the viscoelastic properties of polymers result in changes to related engineering properties of those polymers, e.g., melt flow, stiffness, softening point, tensile strength, and toughness. There are also relationships between viscoelastic properties and the glass transition temperature and the melting temperature for polymer crystallinity.

The addition of materials to alter the Tg of polymers is well known to be useful and widely practiced. Additives that are used to lower the Tg of polymers are called "plasticizers" and can give the compound easier processing and improved properties in use, such as stiffness. Other additives, called "anti-plasticizers", when added in small amounts, raise the Tg of polymers, and can give the compound greater stiffness, such as to permit the easier application of an adhesive polymer while retaining high adhesion in use. Since the novel fullerene-polymer compositions of the present invention also show changes in their Tgs, similar beneficial property effects can also be expected.

In order to identify the novel fullerene-polymer compositions of the present invention, measurements of viscoelastic properties were made by monitoring changes in Tg using Dynamic Mechanical Thermal Analysis ("DMTA") or Differential Scanning Calorimetry ("DSC"). Viscoelastic properties were also measured by means of a melt rheometer. Since a polymer (or block, in the case of a block copolymer) has a particular Tg under a specified set of preparation and measurement conditions, it is possible to identify the existence of a new composition of matter made from a given polymer and a second material, in this case fullerenes, by observing a change in the viscoelastic properties as reflected in the change in the Tg of the composition from that of the polymer alone. For a further discussion of these measurements in relation to Tg, see, for example, L. Sperling, Introduction to Physical Polymer Science, pp. 238-247 (John Wiley & Sons, 1986). Typically, the change in Tg in comparison to that of the polymer alone will occur in the range of from about 0.01 wt. % to about 85 wt. % of fullerenes in comparison to the weight of polymer; more typically from about 0.05 wt. % to about 25 wt. %; and most typically from about 0.1 wt. % to about 20 wt. %.

The amount by weight of fullerenes in the fullerene-polymer compositions of the present invention will depend on the viscoelastic properties desired in the that composition. Given that applicants have taught that certain viscoelastic properties (as indicated by changes in Tg) are to be measured in order to identify when novel fullerene-polymer compositions of the present invention have been produced and given that applicants have disclosed the ranges of weight percents of fullerenes in which one may operate to produce the novel compositions, it is within the skill of one of ordinary skill in the art to select the appropriate weight percentages for the particular composition and properties desired. These properties may readily by measured by one ordinarily skilled in the art using conventional methods of measuring change in thermal capacity or mechanical properties, e.g. by DSC and DMTA, for the pure polymers and fullerenepolymer compositions of the type specified herein.

In one embodiment of the present invention, applicant has found that the novel fullerene-polymer compositions of the present invention show a change, specifically, in the glass transition temperature (Tg) in comparison to the unmodified polymer. Thus, those fullerene-polymer compositions of the present invention that display an increase in Tg also show increased stiffening properties when compared to the initial polymer. Those that display a decrease in Tg have an increased plasticity.

Another embodiment of the present invention concerns a method of making novel fullerene-polymer compositions comprising combining a polymer and fullerenes in a sufficient amount by weight of fullerenes to change the viscoelastic properties, particularly as measured by a change in Tg, of the resulting fullerene-polymer compositions from those of the polymers alone. Typically, the amount of fullerenes to be combined with the polymer is from about 0.01 wt. % to about 85 wt. % in comparison to the weight of the polymer. The conditions at which the fullerenes and polymer may be combined to produce the novel compositions will vary with the particular polymer. However, the method of combination should be chosen in order to facilitate the maximum interaction of the fullerenes with the polymer.

Fullerenes may be combined with the polymer by physical mixing of fullerenes with high molecular weight polymers with or without a solvent or plasticizer present as in the process of the present invention; by polymerization of monomers in the presence of fullerenes; by chain extending combinations of fullerenes and low molecular weight polymers that contain reactive sites; or by subjecting the combination of fullerene and polymer to a crosslinking reaction to form a polymer network.

Where solvents are to be used in order to facilitate the interaction between the fullerenes and polymer, suitable solvents are preferably those which are solvents for both the polymer and the fullerenes. A representative but not exhaustive list of solvents for the fullerenes include aromatic hydrocarbons such as benzene, toluene, xylene; halogenated aromatic hydrocarbons; linear alkanes; cyclic alkanes; methylene chloride; carbon tetrachloride; and carbon disulfide. The selection of the appropriate solvent for the fullerene-polymer combination will depend upon the solubility characteristics of the polymer and is readily determinable by one of ordinary skill in the art (see, e. g., *Polymer Handbook*, Brandrup and Immergut, Wiley, New York, 1990). The temperature of the solution may also have to be chosen to insure the solubility of the polymer, especially for semicrystalline polymers. However, the solubility of the fullerenes and the polymer may be adjusted by the use of appropriate co-solvents, for example, THF or methylene chloride as a co-solvent for toluene.

The process of the present invention should be carried out for a time, at a temperature and under reaction conditions that are sufficient to produce the polymer-fullerene compositions. One method of preparation is as follows: fullerenes are dissolved with stirring in a suitable solvent, such as toluene, the polymer may be codissolved with stirring in the solvent containing fullerenes if soluble therein or in a cosolvent and subsequently combined with the solution of fullerenes if not directly soluble therein. The process is carried out at temperatures and other conditions suitable to solubilize the polymer. The fullerene-polymer composition is isolated by drying in a non-oxidizing atmosphere, such as argon or nitrogen, preferably with stirring, or by precipitation into a solvent or solution in which the composition is not soluble. In another method, the fullerenes may be mechanically combined with the polymer by any of several methods known to one of ordinary skill in the art. The particular method chosen depends on the viscosity of the polymer. For low molecular weight polymers of low viscosity (i.e., less than about 1000 poise at mixing temperature), paint mills, internal mixers and static mixers are effective. Higher molecular weight polymers that exhibit viscosities of greater than or equal to about 1000 poise at the shear rate and temperature of mixing may be mixed with fullerenes in high shear mixers such as two roll mills, internal mixers of the Banbury type, mixing extruders or extruders fitted with static mixers.

The present invention will be further understood by reference to the following examples, which are not intended to restrict the scope of the claims.

EXAMPLE 1

A sample of fullerenes was dissolved in toluene and a sample of polyisoprene was dissolved in toluene, both at room temperature with stirring. After 1 hr. the fullerene-toluene solution was mixed with the polyisoprene-toluene solution with constant stirring. The samples were mixed overnight in a nitrogen atmosphere and then were evaporated in a dessicator connected to an evacuation chamber. The solvent evaporated in approximately ½ hr, however, evacuation was continued overnight. The following table shows the actual amounts of each material used and the Tg as measured by DSC.

TABLE 1

| Polyisoprene (g./30 ml. toluene) | Fullerenes (g.) | Toluene (ml.) | Wt. % Fullerenes in Polyisoprene | Tg (°C.) |
|---|---|---|---|---|
| 0.5011 | 0.0 | 0 | 0.0 | −62.5 |
| 0.3716 | 0.0085 | approx. 17 | 2.24 | −60.4 |
| 0.5882 | 0.0289 | approx. 60 | 4.68 | −60.4 |
| 0.3799 | 0.0605 | approx. 120 | 13.74 | −60.5 |

To perform the DSC measurements, approximately 5 mg of each fullerene-polymer composition was placed into a sample pan to examine their thermal behavior in a Seiko DSC 220C Differential Scanning Calorimeter. In each case, the sample was cooled quickly from room temperature to −105° C., then heated to 155° C. at 10° C./min, held at 205° C. for 20 minutes, cooled rapidly back to −105° C., heated again to 205° C. at 10° C./min, and then cooled back to room temperature. The change in heat capacity of the samples was determined during the heating cycles by reference to an empty sample pan. The Tg measured was the same in both heats for all of the samples listed in Table 1.

EXAMPLE 2

35.3 mg. of fullerenes were dissolved in 20 ml. of sodium distilled toluene and heated to approximately 60° C. In a 125 ml. flask with a Vigreaux column, 3.002 g. of polyisobutylene was dissolved in 125 ml. of toluene with heating to approximately 60° C. and constant stirring. When both samples were dissolved (approximately 5 hours) the fullerene solution was added to the flask with the polyisobutylene solution and stirred for 1 hour. The sample was then dried with a nitrogen purge.

The viscoelastic properties were measured using a Dynamic Mechanical Thermal Analyzer. The sample was prepared for testing by placing 0.8 gm of sample in a rheometrics 25mm vacuum mold. The vacuum mold piston is inserted with a spacer to hold it above the vacuum port. A vacuum is pulled on the sample cavity for about 5 minutes with a mechanical vacuum pump. The mold is heated to 150° C. over a 10 minute period and held at 150° C. for 10 minutes. The heat was then turned off and the spacer removed. Approximately 1000 psi of pressure is then applied to the mold piston. The sample is next cooled to room temperature using $N_2$ purge for 20 to 30 minutes. The piston and sample are then removed from the mold. If the sample cannot be removed from the piston and mold without damage, it may be cooled in liquid nitrogen to facilitate removal. The sample is then cut using a 10 mm diameter sample cutter. The nominal sample thickness is 1 to 3 mm.

The DMTA measurement was performed at a heating rate of 2.5° C. per minute over the temperature range of −100° to 150° C. and at frequencies of both 1 and 10 Hz. Applicants found that the fullerene-polymer composition exhibited two major peaks of approximately equal amplitude in the plot of tan delta (i.e., the ratio of the loss to storage modulus, measured under shear mode) compared to only one major peak observed for the polymer alone. For the fullerenes-polymer composition, these peaks were observed at −23° C. and −10° C. when measured at 1 Hz and at −8° C. and 1° C. when measured at 10 Hz. The sample containing the fullerene-polymer composition also exhibited a greater viscous loss over a greater temperature range than the polymer alone. For the sample containing polyisobutylene alone, only one peak was observed at −11.5° C. in a similar DMTA measurement where a heating rate of 4° C. per minute was used. This temperature corresponds to the Tg of polyisobutylene.

EXAMPLE 3

1.03 gm of the triblock copolymer polystyrene-polyisoprene-polystyrene, known as SIS, was dissolved in 20 ml of sodium distilled toluene. A separate solution consisting of 2% by weight of fullerenes in sodium distilled toluene was prepared using 32 mg of fullerenes. The fullerene solution may be mildly heated in order to enhance the dissolution of the fullerenes. The SIS solution and fullerene solution were then mixed together. The toluene solvent in the resulting solution was allowed to evaporate at room temperature under an nitrogen gas purge. The fullerene-polymer composition was then purged for an additional 30 minutes with heating to 70° C. and then for an additional 4 hours at room temperature in a vacuum oven.

The sample was prepared for DMTA analysis using a procedure similar to that described in Example 2. The DMTA measurement was performed at a heating rate of 3.0° C. per minute over the temperature range of −100° to 150° C. and at frequencies of both 1 and 10 Hz. The plot of tan delta versus temperature was measured at 10 Hz for the sample fullerene-polymer composition. Three major peaks were observed; two major peaks of approximately equal amplitude near −40° C. and −20° C. and a very broad peak near 120° C. By contrast, the sample containing the polymer alone showed only two major peaks were observed, a polyisoprene peak near −40° C. and a polystyrene peak near 120° C. For the fullerene-polymer composition, an additional peak is observed near the polyisoprene Tg. The tan delta peak for the polystyrene is also observed to be significantly broadened over a wide temperature range. The fullerene-polymer composition exhibited a greater viscous loss over a greater temperature range than the sample containing the polymer alone.

EXAMPLE 4

A semicrystalline ethylene-propylene copolymer containing 77 wt. % ethylene was combined with fullerene by dissolving the polymer in toluene at about 1 wt. % of the total composition. Dissolution was carried out by heating the mixture above the crystalline melting point of the polymer (about 80° C.). Three percent by weight of fullerene based on wt. % of polymer was then added and the toluene was then fully evaporated to yield a fullerene-polymer composition containing 3 wt. % fullerenes.

The semicrystalline polymer has a Mooney viscosity of 57 at 125° C. and has an inherent viscosity of 2.4 dl/g in decalin at 135° C. The copolymer exhibited about 25% crystallinity as measured by its heat of melting.

The viscoelastic properties were determined by compression molding samples of the fullerene-polymer composition at 135° C. for 15 min. followed by cooling to room temperature into specimens suitable for testing. Testing was carried out on a Dynamic Mechanical Thermal Analyzer at a heating rate of 2° C./min and a frequency of 1 Hz. There is a decrease in the elastic bending modulus (E') in the 3 wt. % fullerene-polymer composition as compared with the polymer alone. The fullerene-polymer composition exhibited a higher loss modulus than the polymer alone, as shown by the increase in the tan delta (tangent of the bending loss angle). The fullerene-polymer composition also exhibited higher loss modulus over a broader temperature range. The fullerene-polymer composition had a Tg of 4° C. higher than that of the polymer alone (taking the maximum of the tan delta as the Tg).

EXAMPLE 5

2.7 g of an isotactic polypropylene homopolymer ("PP"), with a melt flow rate of 1 g/10 min (measured by ASTM D-1238) and 0.3 g of fullerenes were dissolved in 300 ml of xylene at 130° C. The solution was maintained at this temperature for two hours, after which it was added to 3 liters of methanol cooled to 2° C. in an ice bath. The fullerene-PP precipitate was removed by filtration and dried in a vacuum oven. 2.95 g. of the composition was recovered.

The visoelastic properties of the fullerene-PP composition were measured using a variety of methods. Approximately 5 mg of the fullerene-PP composition was used to examine its thermal behavior in a Seiko Differential Scanning Calorimeter (DSC). The detailed procedure for the DSC testing are similar to those described in Example 1. For the sample of PP alone, the peak melting temperature was 165.6° C. during the first heating cycle and 165.3° C. during the second. For the fullerene-PP composition, the peak melting temperature was 162.5° C. in the first heating cycle and 160.6° C. during the second, which represents a decrease in the melting transition temperature of 3° to 5° C. from that of the PP alone. The melting transition of the fullerene-PP composition also took place over a broader temperature than for the PP alone.

Approximately 0.1 gm of the PP sample was molded into a bar which was 50 mm long, 4.5 mm wide, and 1.18 mm thick and run on a Seiko DMS 110 Dynamic Mechanical Spectrometer (DMS) at 1 Hz. The sample was cooled to −120° C. and then heated to 170° C. at 3° C./min. Both the loss and elastic modulus were measured, as was tan delta. The peak in the loss modulus corresponding to the Tg at 5.6° C. The PP sample alone was also tested in a similar manner by molding a bar of dimension 50×2.7×1.18 mm. The fullerene-PP composition had a Tg of −8.9° C., which represents a decrease in Tg of 14.5° C. from that of the PP alone.

Sample specimens suitable for testing on a Instron 4200 Tensile Strength Tester were made from the PP alone and fullerene-PP composition. Samples were run at room temperature pulling at a rate of 1 inch/min. Three different samples were measured for both the PP alone and the fullerene-PP composition. The results reported here are the average of the three measurements for the PP alone and fullerene-PP composition. For the PP alone, the Young's modulus was found to be 116,500 psi, the elongation to break was 621.9%, the energy to break was 52.56 in-lb, and the tensile strength was 5835 psi. For the fullerene-PP sample, the Young's modulus was found to be 148,300 psi, the elongation to break was 484.0%, the energy to break was 39.04 in-lb, and the tensile strength was 4090 psi. The fullerene-PP composition was stiffer, but less tough than the PP alone.

Sample specimens suitable for testing on a Rheometrics RMS-800 rheometer were prepared by molding a circular disc 25 mm in diameter and 0.5 mm thick. Samples were tested at 50% strain at 200° C. at shear rates of 0.01 to 100 $sec^{-1}$. For the sample containing PP alone, the zero-shear viscosity was found to be $1.2 \times 10^4$ poise, the shear storage modulus at 1 $sec^{-1}$ was $2.58 \times 10^3$ dynes/$cm^2$, and the shear loss modulus at 1 $sec^{-1}$ was $4.44 \times 10^3$ dynes/$cm^2$. For the fullerene-PP composition, the zero-shear viscosity was found to be $3.2 \times 10^4$ poise, the shear storage modulus at 1 $sec^{-1}$ was $4.99 \times 10^3$ dynes/$cm^2$, and the shear loss modulus at 1 $sec^{-1}$ was $9.31 \times 10^3$ dynes/$cm^2$. The fullerenes-PP composition had a substantially increased melt viscosity and shear modulus from that of the PP alone.

EXAMPLE 6

A mixture of DER 332 (Dow Chemical tradename for diglycidyl ether of bisphenol A) epoxy resin and a crosslinking agent, 4,4'diaminodiphenyl sulfone (DDS) were prepared by dissolving, with the aid of mechanical stirring, 30 g. of DDS into 100 g. of DER 332 preheated to 125° C. Then, 0.3 g. of fullerene were dispersed mechanically into 5.7 g. of the DER 332/DDS mixture at 90° C., followed by vacuum degassing at 90° C. for 5 minutes to prepare an epoxy polymer with 5 wt. % fullerenes. The final mixture was poured into a silicone rubber mold under the same conditions. The mold casted rectangular bars with dimensions of about 50 mm long, 4 mm wide and 2 mm thick were then tested on a Seiko DMS 110 Dynamic Mechanical Spectrometer (DMS) under simultaneous, multiple frequency scan, from 140° C. to 300° C. at the heating rate of 3° C./min. Both the storage modulus, loss modulus and loss tangent, the ratio of the loss to storage modulus, were measured (by DMTA).

At 20 Hz, the Tg, taken as the peak in the loss modulus was found to be 230.1° C. for the control epoxy and 225.5° C. for the epoxy with 5 wt. % fullerenes.

At 140° C., the flexural modulus of epoxy with 5 wt. % fullerene (2 GPa), measured from DMS, is only 50% of that of the control epoxy (4 GPa). While at 25° C., the modulus of fullerene-epoxy composition (1.2 GPa) is about 85 % of that of the control epoxy (1.4 GPa).

The fullerene-epoxy composition had a lower Tg and modulus in the glassy state than did the polymer alone.

What is claimed is:

1. A fullerene-polymer composition comprising: a polymer and a sufficient amount by weight of fullerene in comparison to the polymer to result in a modification of the viscoelastic properties of the fullerene-polymer composition compared to those of the unmodified polymer, wherein the fullerenes are selected from the group consisting of fullerenes having the formula $C_{2n}$, where n is greater than 15, and mixtures thereof.

2. The composition of claim 1 wherein the modification of the viscoelastic properties results in a change in Tg compared to that of the unmodified polymer.

3. The composition of claim 1 wherein the amount of by weight of fullerene is from about 0.01 wt. % to about 85 wt. % of the weight of total fullerene-polymer composition.

4. The composition of claim 1 wherein the fullerenes are selected from the group consisting of $C_{60}$, $C_{70}$ and mixtures thereof.

5. The composition of claim 1 wherein the polymer has a number average molecular weight of greater than about 500 and is selected from the group consisting of homopolymers, copolymers, block polymers and thermosets.

6. A process of making a fullerene-polymer composition, comprising: combining a polymer and a sufficient amount of fullerenes to result in a modification of the viscoelastic properties of the fullerenes-polymer compared to those of the polymer alone.

7. The process of claim 6 wherein the modification of viscoelastic properties results in a change in Tg compared to that of the polymer alone.

8. The process of claim 6 wherein the amount of fullerenes is from about 0.01 wt. % to about 85 wt. % of the weight of the total composition.

9. The process of claim 6 wherein the amount of fullerenes and polymer are combined in the presence of a solvent.

10. The process of claim 6 wherein the amount of fullerenes is from about 0.1 wt. % to about 20 wt. % of the weight of the total composition.

11. The process of claim 6 wherein the fullerenes are selected from the group consisting of $C_{60}$, $C_{70}$ and mixtures thereof.

12. The process of claim 6 wherein the polymer has a number average molecular weight of greater than about 500 and is selected from the group consisting of homopolymers, copolymers, block polymers and epoxy resins.

13. A fullerene-polymer composition produced by the process of combining a polymer and a sufficient amount of fullerenes to result in a change or modification of the viscoelastic properties of the fullerene-polymer composition compared to that of the polymer alone, and wherein said amount of fullerenes is from about 0.01 wt. % to about 85 wt. % of the weight of the total composition.

* * * * *